Dec. 9, 1941.  H. E. TAUTZ  2,265,406
MACHINE CABINET
Filed Dec. 12, 1938  2 Sheets-Sheet 1

WITNESSES
L. E. Kiuan
C. L. Naal

INVENTOR
Herbert E. Tautz
By R. H. Caldwell
ATTORNEY

Dec. 9, 1941. H. E. TAUTZ 2,265,406
MACHINE CABINET
Filed Dec. 12, 1938 2 Sheets-Sheet 2
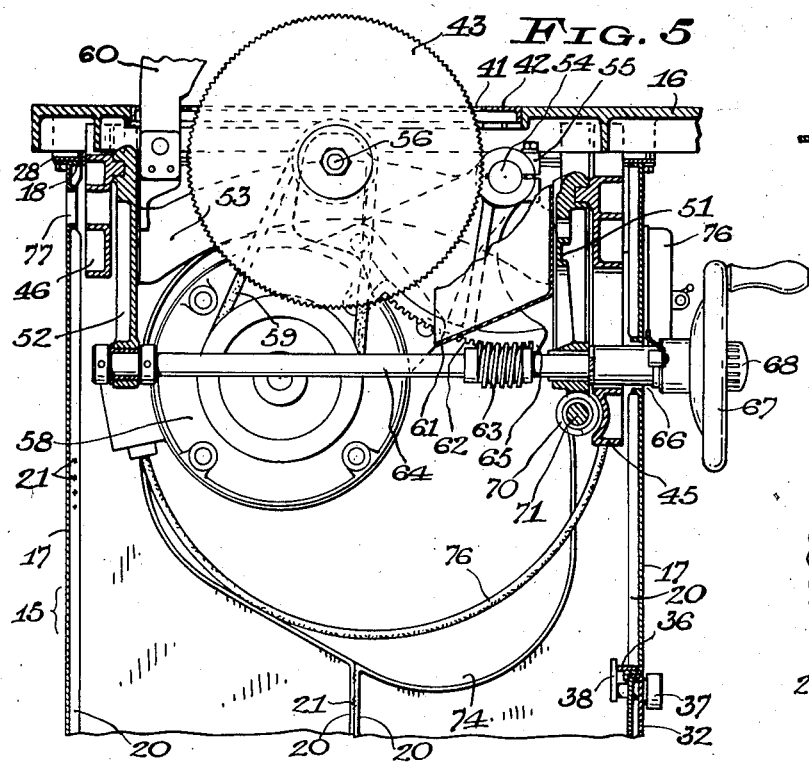
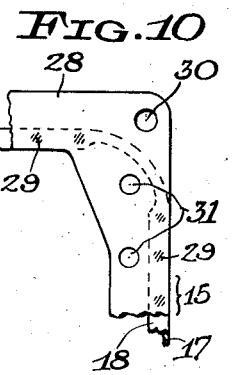
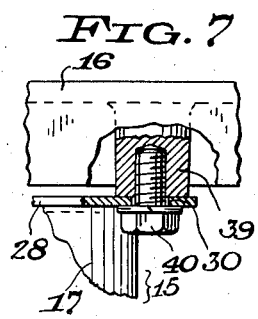
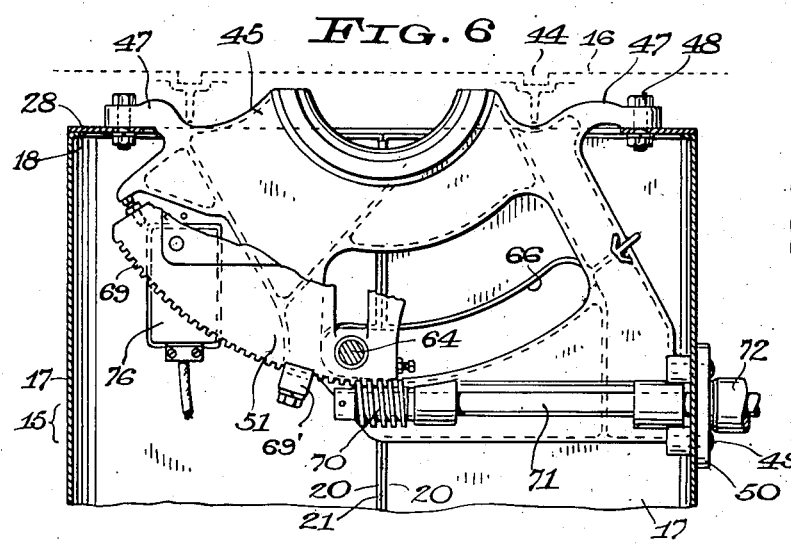
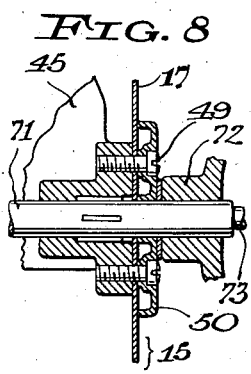
WITNESSES
L. E. Kilian
C. L. Waal
INVENTOR
Herbert E. Tautz
By R. H. Caldwell
ATTORNEY Patented Dec. 9, 1941

2,265,406

UNITED STATES PATENT OFFICE 2,265,406

MACHINE CABINET

Herbert E. Tautz, Milwaukee, Wis., assignor to The Delta Manufacturing Company, Milwaukee, Wis., a corporation of Wisconsin Application December 12, 1938, Serial No. 245,199

4 Claims. (Cl. 312—163)

This invention relates to cabinets or housings for power-driven tools and other machines.

An object of the invention is to provide a machine cabinet which combines strength, rigidity and durability with light weight construction, which will facilitate accurate mounting of machine parts, which possesses a smooth and neat appearance, and which can be manufactured at relatively low cost.

The invention further consists in the several features hereinafter described and claimed.

In the accompanying drawings, wherein by way of example the invention is shown to be embodied in a circular saw of the tilting arbor type;

Fig. 5 is a sectional elevation taken generally along the line 5—5 of Fig. 1;

Fig. 6 is a sectional elevation taken generally along the line 6—6 of Fig. 2;

Fig. 7 is a detail sectional elevation of the table mounting;

Fig. 8 is a detail sectional elevation taken generally along the line 8—8 of Fig. 3;

Fig. 9 is a detail sectional elevation taken generally along the line 9—9 of Fig. 2, and Fig. 10 is a detail plan view of a corner portion of the cabinet.

Figure 2:
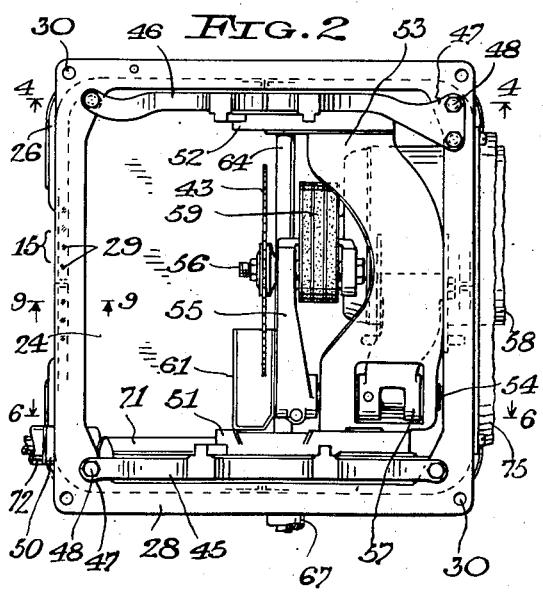
Fig. 2 is a top view of the saw with the table thereof removed, and parts being broken away.

In these drawings, 15 designates an upright tubular casing on which is mounted a work-supporting table or platform 16 and circular saw mechanism hereinafter described. The casing 15 is here indicated to be of rectangular box-like shape and comprises vertical side walls formed by four connected panels 17 of suitable gauge sheet metal, each panel being bent to an angular shape and having a rounded corner, and each bent panel or casing section having inturned top and bottom flanges 18 and 19, respectively, and inturned vertical side flanges 20. The four casing sections 17 are assembled in suitable jigs to form the tubular casing structure which is of rectangular cross-section, the adjacent side flanges 20 being rigidly secured together by spot welding 21, and the vertical joints between the casing sections extending centrally along the side walls. Apertured sheet metal gusset plates 22 rest on the inturned bottom flanges 19 of the united casing sections and are rigidly secured thereto, preferably by spot welding 23, Fig. 3. A sheet metal bottom plate 24 is rigidly secured to the bottom faces of the inturned flanges 19, as by bolts 25 passing through the gusset plates and flanges. The corner portions of the bottom plate 24 rest on flanged cast metal feet 26 which project beyond the planes of the cabinet side walls and are rigidly secured in place by the bolts 25, each foot having a slotted bottom flange 27, Fig. 4, to facilitate fastening to a floor. A flat sheet metal top plate 28, preferably of heavier stock than the cabinet side walls, rests on the inturned top flanges 18 of the side walls and is rigidly secured thereto, preferably by spot welding 29 at suitable intervals. As best seen in Fig. 2, the top plate 28 is in the form of a rectangular loop. The sheet metal top plate presents an accurate flat top surface for mounting various members hereinafter described, and is provided adjacent its corner portions with bolt-receiving openings 30 and 31, Fig. 10. The front and rear edges of the top plate project outwardly from the cabinet walls. The various parts of the cabinet are held in suitable jigs during attachment, so as to provide accurate assembly.

Figure 1:
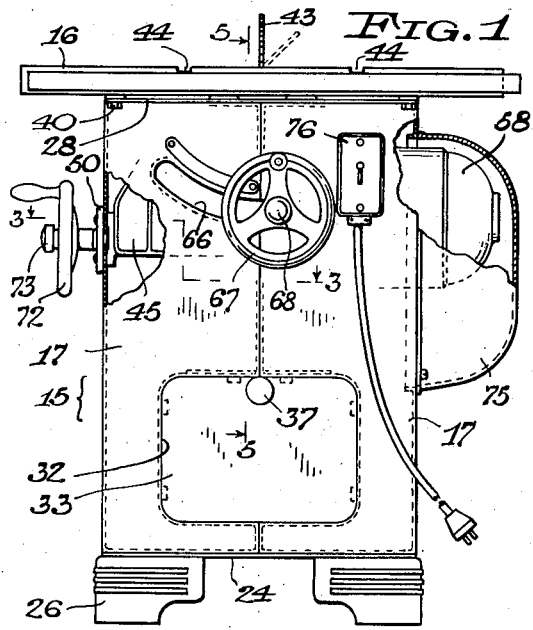
Fig. 1 is a front elevation of the circular saw, parts being broken away and parts being shown in section.
Figure 3:
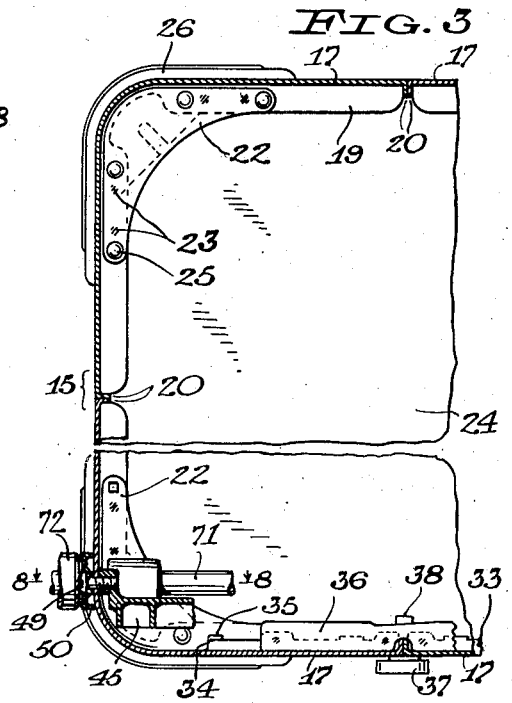
Fig. 3 is a sectional view taken generally along the line 3—3 of Fig. 1.

The front wall of the cabinet has an opening 32 for a removable door 33, the wall having inwardly projecting complementary flanges 34, Fig. 3, around the opening, and the flanges having stop ears 35 for the door. The flanges 34 form continuations of the casing flanges 20. A cam plate 36 is spot welded to the cabinet along the flanged upper edge of the door opening, and the door carries a latch 37 with a swingable bolt 38 engageable with the cam plate. The door provides access to the interior of the cabinet and permits removal of sawdust or other debris. The cabinet also has other openings as hereinafter described.

Figure 4:
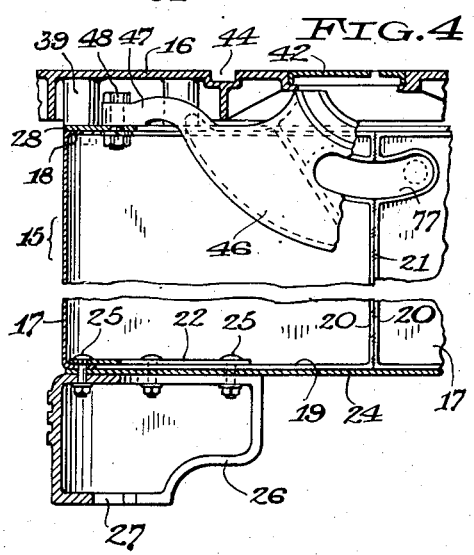
Fig. 4 is a sectional elevation taken generally along the line 4—4 of Fig. 2.

The work-supporting table or platform 16 is detachably mounted on the top plate of the cabinet and is provided with tapped embossments 39, Figs. 4 and 7, which rest on the corner portions of the top plate and which are rigidly secured thereto by screws 40 passing through the openings 30 of the top plate, the table being suitably ribbed on its underside. The machine illustrated is a tilting arbor circular saw, and the table is accordingly provided with the usual saw slot 41, preferably formed in a detachable insert plate 42, to receive therethrough a circular saw blade 43. The table also has the usual guideways 44 extending parallel to the saw blade, and is capable of a slight angular adjustment on the cabinet top plate 28 to secure such parallelism, this adjustment being effected before the screws 48 are fully tightened. The table and cabinet provide a mutual bracing effect so as to improve the rigidity of the machine.

A pair of apertured front and rear frame members or trunnion brackets 45 and 46, respectively, are placed in the cabinet adjacent the front and rear walls thereof, each bracket having ears 47 at opposite ends resting on the top plate 28 of the cabinet and rigidly secured thereto by bolts 48 passing through the top plate openings 31. One of the ears on the rear bracket, 46, is here shown to be widened, Fig. 2, and to be fastened by two bolts, so as to prevent any tendency to tipping. The front bracket 45 has a lower portion which at one end abuts against the inner face of one of the side walls of the cabinet and is secured thereto by screws 49 which also pass through a clamping plate 50 at the outer face of this side wall.

Between the trunnion brackets 45 and 46 is mounted a cradle which comprises front and rear trunnions 51 and 52, respectively, rigidly connected by an arched yoke 53, the trunnions having arcuate tongue-and-groove pivotal connections with the trunnion brackets, and the pivotal axis of the cradle lying substantially in the plane of the table top and in the plane of the saw blade 43. A rock shaft 54 is journalled in the front portion of the yoke 53 and carries an arm 55 in the forked free end of which is journalled an arbor 56 for the saw blade, the axes of the shaft 54 and saw arbor 56 being parallel. The rock shaft 54 also carries an arm 57 on which an electric motor 58 is adjustably mounted, the motor having a multiple V-belt drive 59 with the saw arbor. The rear trunnion 52 carries a detachably mounted splitter 60, Fig. 5, which extends through the slotted insert plate 42, and the front trunnion carries a suitable sawdust guard 61.

The saw arbor and motor are raised and lowered by a sector 62 on the arm 55, Fig. 5, meshing with a worm 63 on a horizontal shaft 64 journalled in the front and rear trunnion brackets, the sector having stop projections 65 engageable with ends of the worm. The shaft 64 extends through an arcuate slot 66 in the front wall of the cabinet and carries a hand-wheel 67 and a suitable locking device 68.

The saw arbor is tiltable between limit positions by means of a sector 69 on the front trunnion 51, Fig. 6, meshing with a worm 70 on a horizontal shaft 71 journalled in the front trunnion bracket 45, the sector being confined against lateral movement by a guide member 69' secured to this bracket. The shaft 71 extends through a side wall of the cabinet and the clamping plate 50 and carries a hand-wheel 72 and a suitable locking device 73.

The opposite side wall of the cabinet has an opening 74 to provide clearance for the motor 58, the opening being normally closed by a dome-shaped cover 75 bolted to the cabinet. The front wall of the cabinet carries a switch box 76 which is connected to the movably mounted motor by a flexible conductor cord 76'. The rear wall of the cabinet has an arcuate slot 77 adapted to receive therethrough a suitable guard support, not shown. The cabinet side walls are inwardly flanged around the motor opening 74 and the arcuate slots 66 and 77. If desired, a blower or suction device, not shown, may be applied to the cabinet to carry off most of the sawdust.

In the operation of the machine, the saw arbor is driven by the electric motor 58 and work is passed over the table to be cut by the rotating saw blade. The saw may be raised or lowered by turning the hand-wheel 67, and may be tilted by turning the hand-wheel 72.

The table 16 and the trunnion brackets 45 and 46 are secured to the top plate 28 of the cabinet at points adjacent the corners of the cabinet, which are the regions of maximum stiffness, each trunnion ear being adjacent a point of connection of the table. The top plate provides a smooth and accurate top surface without need for machining. Although the cabinet is of relatively light weight it possesses the requisite rigidity. The inturned vertical flanges 20 of the casing sections and the inturned flanges around the various openings also improve the rigidity. The cabinet presents a smooth and neat appearance, and no welding marks are visible after the machine is set up for use.

The four angular sheet metal casing sections 17 may be formed from identical blanks, it being only necessary to vary the positions of the openings and notches. This greatly reduces the expense of dies and tools for these parts, as many of the same dies and tools can be used for all four of these sections.

While the invention is here shown to be embodied in a circular saw, the invention is also applicable to other machines, such as shapers. The size, position and number of the side wall openings will vary in different machines, but in many instances the same casing section blanks may be used.

The specific wood working machine disclosed is shown and claimed in my copending applications Serial No. 252,744, filed January 25, 1939; Serial No. 259,095, filed March 1, 1939; and Serial No. 269,343, filed April 22, 1939.

What I claim as new and desire to secure by Letters Patent is:

1. In a machine cabinet, a plurality of sheet metal panels forming a cabinet of generally rectangular shape in plan and having four substantially vertical walls, said panels extending substantially vertically in side-by-side relationship, the side edges of each panel being bent to provide an inwardly directed flange; and means for securing the neighboring flanges of said panels together in tightly engaging relationship, so as to rigidly maintain the cabinet in assembled condition and provide a plurality of double-flanged stiffening seams extending along the mid-portions of the four walls thereof, two adjacent panels having flanged mating recesses therein cooperating to provide an opening in one side wall of said cabinet, the flanges of said recesses merging into the flanges of the side edges of said two adjacent panels.

2. In a machine cabinet, a generally rectangular cabinet made up of a plurality of sheet metal panels rigidly secured together in side-by-side relationship and terminating at its upper edge in an inwardly directed flange; a generally rectangular frame rigidly secured to the upper side of said flange; a machine support disposed within said cabinet and having a pair of upwardly and outwardly directed supporting portions, said supporting portions resting upon the upper side of said frame and having means for rigidly securing them thereto, a top member on said cabinet and completely covering said frame; and means for securing said top member to said frame independently of said machine support.

3. In a machine cabinet, a generally rectangular cabinet having four substantially upright walls and being made up of a plurality of sheet metal panels rigidly secured together in side-by-side relationship and terminating at its upper edge in an inwardly directed flange; a generally rectangular frame rigidly secured to the upper side of said flange; a machine support disposed within said cabinet and having a pair of upwardly and outwardly directed supporting portions, said supporting portions resting upon the upper side of said frame and having means for rigidly securing them thereto, said machine support also having a third supporting portion extending downwardly in said cabinet and terminating in a clamping face lying flush against the inner surface of one of said upright walls, and means for rigidly securing said one wall in tight surface engagement with the clamping face of said third supporting portion of said machine support.

4. In a machine cabinet, a generally rectangular cabinet made up of a plurality of sheet metal panels rigidly secured together in side-by-side relationship and terminating at its upper edge in an inwardly directed flange; a generally rectangular frame rigidly secured to the upper side of said flange; a machine support disposed within said cabinet and having a pair of upwardly and outwardly directed supporting portions, said supporting portions resting upon the upper side of said frame and having means for rigidly securing them thereto, a table member having a plurality of downwardly directed clamping faces provided on its lower surface designed for direct engagement with predetermined areas of said frame, and having recess means to receive the parts of said supporting portions which project above said frame, and means for securing said table member to said frame, with the latter in clamping engagement with the clamping faces of said table member independently of said supporting portions.

HERBERT E. TAUTZ.